R. H. WHITE.
AGRICULTURAL MACHINE.
APPLICATION FILED DEC. 3, 1915.
1,316,990.
Patented Sept. 23, 1919.
2 SHEETS—SHEET 2.
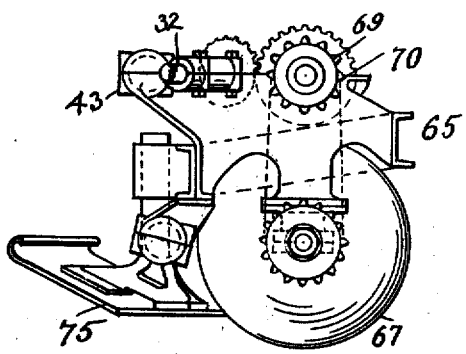
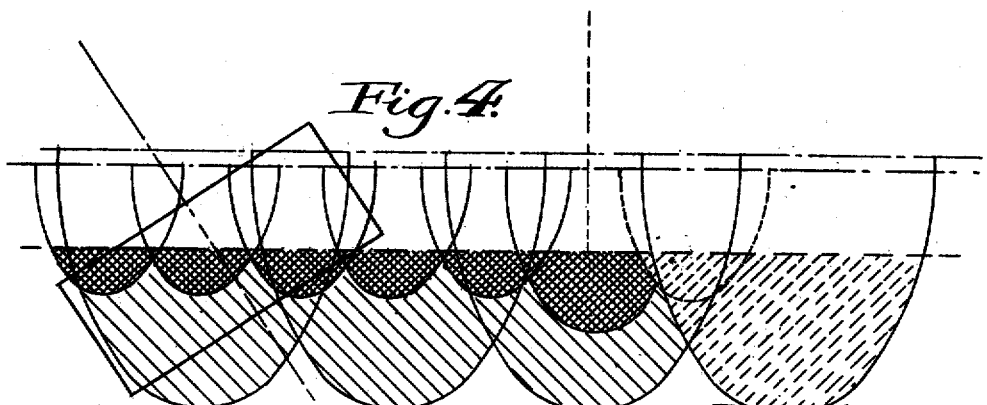

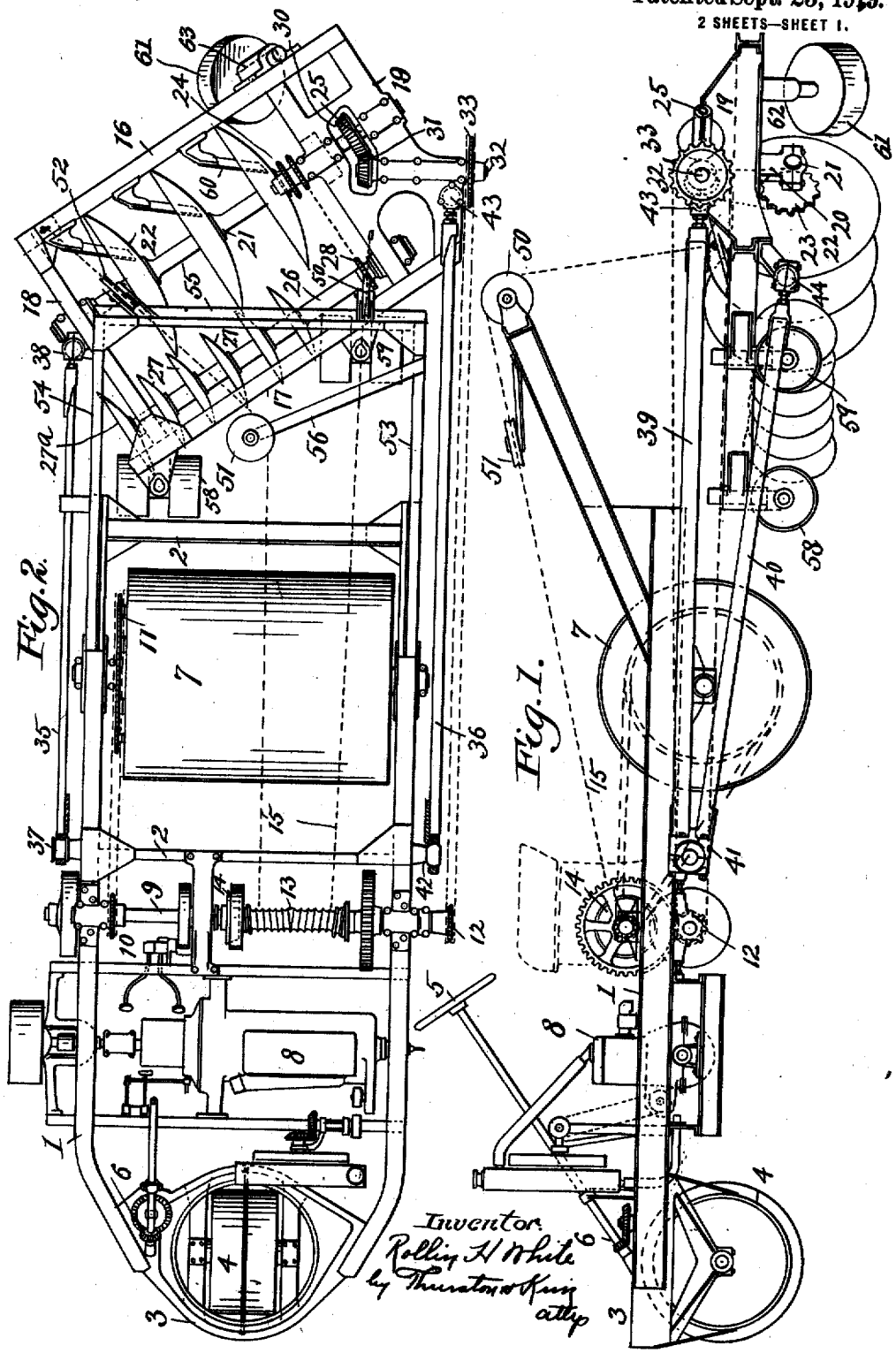

UNITED STATES PATENT OFFICE.

ROLLIN H. WHITE, OF SHAKER HEIGHTS, OHIO, ASSIGNOR, BY DIRECT AND MESNE ASSIGNMENTS, TO THE CLEVELAND TRACTOR COMPANY, OF CLEVELAND, OHIO, A CORPORATION OF OHIO.

AGRICULTURAL MACHINE.

1,316,990. Specification of Letters Patent. Patented Sept. 23, 1919.

Application filed December 3, 1915. Serial No. 64,809.

*To all whom it may concern:*

Be it known that I, ROLLIN H. WHITE, a citizen of the United States, residing at Shaker Heights, in the county of Cuyahoga and State of Ohio, have invented a certain new and useful Improvement in Agricultural Machines, of which the following is a full, clear, and exact description.

This invention relates to an agricultural device, the object of the invention being to provide an agricultural device in which side thrust of the machine is effectually taken care of, and, further, in which the soil engaging implements are so arranged as to effect a preparation of the ground so that the turning over of the soil may be complete and effective. Other objects will appear as the invention is described in greater detail.

Generally speaking, the invention may be said to comprise the elements and combinations thereof set forth in the accompanying claims.

Reference should be had to the accompanying drawings forming a part of this specification, in which Figure 1 is a side elevation of the machine; Fig. 2 is a top plan view of the machine; Fig. 3 is a side elevation of a portion of the machine with the harrowing disks attached; and Fig. 4 is a diagrammatic illustration showing a development of the relationship of the disks to each other and to the soil upon which they are operating.

The agricultural machine of this invention comprises a chassis 1 which is composed of usual side members. These side members are joined by cross members such as indicated at 2, and at the forward end the chassis carries a support 3 in which is suitably mounted a ground engaging roller 4. The roller is mounted so that it may turn or rotate in its mounting and the whole mounting for the roller 4 is so mounted that it may be turned for the purpose of steering the roller 4. The mounting 3 for the roller 4 is turned for steering purposes by means of a suitable steering wheel and rod as indicated at 5, which wheel and rod are by means of suitable gearing indicated at 6 connected with a mounting for the roller 4.

At a suitable distance behind the front portion the chassis is supported upon a ground engaging roller 7.

Adjacent the forward portion of the chassis an engine 8 is supported, this engine being suitably connected with a counter or jack-shaft 9. The counter-shaft is provided with a sprocket 10 which is in line with a sprocket 11 upon the roller 7 and a suitable chain connects the sprockets 10 and 11 so that the roller 7 may be driven to propel the machine. The shaft 9 also carries a sprocket 12, this sprocket and a suitable chain being employed in combination with other mechanism for driving the soil engaging disks to be described later.

The shaft 9 also carries a drum 13 which may be connected to or disconnected from the shaft by means of a clutch 14. The drum is adapted to receive cables as indicated at 15, which cables are for the purpose of elevating and lowering a disk frame which will be later described.

It will be understood that there are suitable levers such as are customarily used in connection with an engine and jack-shaft for effecting connection between the two.

Extending behind and somewhat below the chassis 1 is what I am pleased to term a "disk frame." I apply this term with the full intention of including other forms of soil engaging instrumentalities than disks, but inasmuch as in this particular disclosure disks are employed, the term "disk frame" seems a fitting term. This disk frame comprises side members 16 and 17 and end members 18 and 19. Depending from the end members 18 and 19 are hangers, one of which is indicated at 20, the hanger depending from the end member 18 not being shown in any of the figures of the drawing. These hangers support a shaft 21, the shaft being rotatable and carrying the disks 22 which are secured to the shaft so as to rotate therewith. The shaft carries a sprocket wheel 23 which is in line with a sprocket wheel 24 that is carried upon a shaft 25, which shaft is suitably journaled upon the end member 19. The sprocket wheels 23 and 24 are in alinement and a suitable sprocket chain forms a driving connection between them.

There is also a shaft 26 which is supported by suitable journals that are secured to and extend beneath portions of the end members 18 and 19 of the disk frame. The shaft 26 has secured to it disks 27 which rotate with the shaft. The shaft 26 also carries a sprocket 28 which is in line with a sprocket 29 upon the shaft 25 and a suitable sprocket chain is used to operatively connect the two sprockets.

The shaft 25 is provided with a gear 30, this gear being in mesh with a gear 31 which is carried upon a shaft 32. The shaft 32 is suitably mounted in the end member 19 and at its end carries a sprocket 33 which is in line with the sprocket 12 carried by the jack-shaft 9. These two sprockets mentioned are connected by a suitable sprocket chain, thereby effecting a driving relationship.

The disk frame is spaced and held in a more or less definite relationship with respect to the chassis by side spacer rods which are generally indicated at 35 and 36. The spacer rod 35 at one end engages with an annular projecting member 37 upon the chassis. The construction permits the member 35 to turn upon the member 37. The member 35 at its opposite end is connected to the disk frame by some sort of flexible connection which in the particular instance is a ball and socket joint indicated at 38.

The member 36 is composed of two parts, 39 and 40. These two parts are at one end joined to a head 41 which engages with a projecting member 42 carried by the chassis. The end of the member 42 has the surface of a portion of a sphere and the head 41 which engages with the member 42 is also provided with a surface which is complementary to the surface upon the member 42. This permits not only a pivoting action about the member 42 but a partial rolling action.

The members 39 and 40 diverge somewhat as they extend from the head 41, the member 39 being secured to the end member 19 of the disk frame at the upper or top part of this frame by means of a ball and socket joint, as indicated at 43. The part 40 extends slightly beneath the disk frame and is by means of a ball and socket joint 44 connected with the disk frame. The particular construction of the members 39 and 40, and their relationship to the disk frame and the chassis, prevent any tipping action of the disk frame but at the same time provides a very flexible connection between the chassis and the disk frame so that the movement of the disk frame as it works upon the soil will be entirely free and not be affected by the movement of the forward part of the machine as the rollers 4 and 7 of the chassis may pass over uneven ground.

The disk frame is adapted to be raised and lowered, this for the purpose of keeping the disks from engaging the soil where this action is not desired. In the normal use of the machine, however, the disk frame is unsupported, the disks resting upon the soil and supporting in connection with members 58 and 59 the entire weight of the disk frame. As has been before described, there is a drum 13 carried by the jack-shaft 9, which drum is adapted to receive the cables 15. One of these cables extends over a sheave 50 and is secured to the end member 19. The other cable extends in contact with sheaves 51 and 52 and is connected to the disk frame adjacent the end opposite to that at which the first cable is connected. The operation for raising and lowering the disk frame will be obvious from the construction as described.

The sheaves 50, 51 and 52 are carried by a frame comprising side members 53 and 54 which are joined by a top or end member 55. Sheaves 50 and 52 are supported directly by the top member 55, but the sheave 51 is supported by an arm 56 which in turn is suitably supported by one of the members comprising the frame just described.

The side of the disk frame which is nearest to the chassis is supported with relation to the ground by suitable devices, such as indicated at 58 and 59. In the particular instance these devices are rollers and are journaled in suitable brackets carried by the side member 17.

The shaft 26, as previously described, carries the disks 27 and a disk 27$^a$ which is upon a portion of the shaft 26 that extends beyond the end member 18. This disk 27$^a$ is slightly larger than the other disks 27. The disks 27 and 27$^a$ engage the soil ahead of the disks 22 and prepare the soil by cutting turf and roots which are near the surface, thus breaking up the top portion of the ground so that the ground will not break in clots but will be pulverized. The disks 27 are so spaced with relationship to each other that they will operate upon a strip of ground of substantially the same width as would be operated upon by the disks 22, so that the strip which will be operated upon by the disks 22 is in prepared condition to receive these disks.

The disk 27$^a$, because of its position with respect to the larger disks 22, has in addition to its function of preparing the soil for the large disks, the added function of breaking down a ridge of ground which may be left between the last furrow of a previous plowed strip and the first furrow when starting a new strip. This ridge of ground occurs when in starting to plow a strip the machine is a little too far over and not quite close enough to the last furrow of the previously plowed strip.

Furthermore, when starting to cut new ground the thrust against larger disks is relieved by the largest of the small disks making a partial furrow for the larger disk adjacent thereto to follow and turn over the soil into it.

It will be understood from the prior description of the machine that the disks 22 and the disks 27 are all driven. The rotation of the disks assists not only in a more effective turning of the soil but at the same time assists materially in the movement of the machine.

For each of the disks 22 a scraper blade is provided, such as indicated at 60. This scraper blade keeps the disks 22 clear and free from accumulation of soil which would hinder or make less effective their action upon the soil and retard progress of the machine.

It will be appreciated that there is considerable side thrust upon the disk frame as the disks are in operation in the soil. In order to overcome this side thrust there is provided a thrust wheel such as indicated at 61. The thrust wheel has a rather broad flat peripheral surface which engages with the side wall of the last furrow that is being cut. This will be seen by a reference to Fig. 7, the angle of the rollers 60 being such as to engage the wall under pressure so as to offset the thrust produced by the disks engaging and turning the soil. The roller 61 is mounted upon a shaft 62 which shaft is journaled in a bracket 63. This bracket is mounted upon the member 16 of the disk frame and is so mounted that it may be adjusted along the member 16, the purpose of providing the adjustment being to enable the roller 61 to press with greater or less force against the side of the furrow with which it is in engagement, thus providing a variation of the position of the roller 61 in accordance with the side thrust which must be overcome to keep the machine in line.

The frame is in part supported and the cutting depth of the disks is governed by an adjustable ground engaging shoe 75.

Having described my invention, I claim:

1. An agricultural machine, comprising two parts, the one part being mounted on rotatable means, means for driving the first part, the second part comprising a frame, side rods which at one of their ends are pivotally connected with the first part of the machine, and at their other ends are connected by universal connection to the second part of the machine, soil engaging implements carried by said frame, and means carried by the frame contacting with a furrow made by the ground engaging implement to counteract side thrust induced by the soil engaging implement passing through the ground.

2. An agricultural machine, comprising two parts, the one part being mounted on rotatable means, means for driving the first part, the second part comprising a frame, side rods which at one of their ends are pivotally connected with the first part of the machine, and at their other ends are connected by universal connection to the second part of the machine, the second part of the machine being provided with two soil engaging implements, one of the soil engaging implements engaging the soil ahead of the other to prepare the soil for engagement by the second implement, and means contacting with a furrow made by the ground engaging implements to counteract side thrust induced by the soil engaging implement passing through the soil.

3. An agricultural machine, comprising two parts, one part being a traction part, the other part comprising a frame, side rods which at one of their ends are pivotally connected with the traction part of the machine, and at their other ends are connected by universal connection with the said frame, a plurality of ground engaging implements carried by said frame, certain of the ground engaging implements being arranged to engage the ground ahead of other of said implements and a thrust member carried by said frame and adapted to engage with a furrow to counteract the side thrust incident to the engagement of the ground by the ground engaging implements.

4. An agricultural machine, comprising two parts, one part being a traction part, the other part comprising a frame, side rods which at one of their ends are pivotally connected with the traction part of the machine, and at their other ends are connected by universal connection with the said frame, a plurality of gangs of disks carried by the said frame, one gang of disks being arranged ahead of the other gangs of disks and adapted to engage the uncut ground ahead of the other disks, said disks preparing the ground by cutting the turf, etc., ahead of the other disks.

5. An agricultural machine, comprising two parts, one part being a traction part, the other part comprising a frame, side rods which at one of their ends are pivotally connected with the traction part of the machine, and at their other ends are connected by universal connection with the said frame, a plurality of gangs of disks carried by the said frame, one gang of disks being arranged ahead of the other gangs of disks and adapted to engage the uncut ground ahead of the other disks, said disks preparing the ground by cutting the turf, etc., ahead of the other disks, and a roller carried by the said frame and adapted to engage with one side of a furrow thereby to overcome the side thrust incident to the disks passing through the ground.

6. An agricultural machine, comprising two parts, one part being a traction part, the other part comprising a frame the longitudinal axis of which lies at an angle with respect to the axis of the traction part, side rods which at one of their ends are pivotally connected with the traction part of the machine, and at their other ends are connected by universal connection with the said frame, two shafts carried by said frame, each of said shafts being provided with ground engaging disks, the disks on one of the shafts engaging the uncut soil ahead of the disks on the other shaft, thereby to prepare the ground for the second set of disks, and means for driving both sets of disks from the traction part of the machine.

7. An agricultural machine, comprising two parts, one of the parts being a traction part, the other of said parts comprising a frame the axis of which is inclined with respect to the axis of the traction part, which at one of their ends are pivotally connected with the traction part of the machine, and at their other ends are connected by universal connection with the said frame, a plurality of shafts carried by said frame, both of said shafts having ground engaging disks mounted thereon, the shaft nearest the traction part having disks which are smaller in diameter than the other of said shafts, the said smaller disks being so arranged upon their shaft with respect to the disks upon the other of said shafts that they will engage the ground along a strip which is substantially of the same width as that which will be engaged by the larger disks, the smaller disks being adapted to engage the uncut ground ahead of the larger disks to prepare the ground for engagement by the second disks.

8. An agricultural machine, comprising two parts, one of the parts being a traction part, the other of said parts comprising a frame, means for flexibly holding the said frame in spaced relationship to the traction part, two shafts carried by said frame, both of said shafts carrying ground engaging disks, the disks on the shaft nearest the traction part being of smaller diameter than the other of said disks, the end disk of the smaller of said disks being slightly larger in diameter than the other of the disks upon the same shaft, the smaller disks engaging the uncut ground ahead of the larger disks thereby to prepare the ground for engagement by the larger disks.

In testimony whereof, I hereunto affix my signature.

ROLLIN H. WHITE.

Copies of this patent may be obtained for five cents each, by addressing the "Commissioner of Patents, Washington, D. C."